United States Patent [19]

Jefferies et al.

[11] Patent Number: 4,714,048

[45] Date of Patent: Dec. 22, 1987

[54] LIQUID FLOW SENSING DEVICE

[75] Inventors: Keith W. Jefferies, Palmerston North; Murray D. Long, Foxton, both of New Zealand

[73] Assignee: Allflex International Limited, Palmerston North, New Zealand

[21] Appl. No.: 798,687

[22] Filed: Nov. 15, 1985

[30] Foreign Application Priority Data

Nov. 19, 1984 [NZ] New Zealand .................. 210240

[51] Int. Cl.⁴ ............................................... A01J 7/00
[52] U.S. Cl. ................................. 119/14.08; 119/14.14
[58] Field of Search ............................ 119/14.14, 14.08

[56] References Cited

U.S. PATENT DOCUMENTS

| | | | |
|---|---|---|---|
| 3,878,819 | 4/1975 | Harman | 119/14.08 |
| 3,884,187 | 5/1975 | Massie et al. | 119/14.14 |
| 3,989,009 | 11/1976 | Robar et al. | 119/14.08 |
| 4,010,715 | 3/1977 | Robar et al. | 119/14.14 |

Primary Examiner—Paul J. Hirsch

Attorney, Agent, or Firm—Blakely, Sokoloff, Taylor & Zafman

[57] ABSTRACT

A liquid flow sensing device which incorporates a flow sensor having a liquid flow passage through which liquid can flow. A first electrode is disposed with a first wall of the flow passage such that the electrode extends about a portion of the flow passage. A second electrode is disposed with a second wall of the flow passage in that portion of the flow passage about which the first electrode extends. The first and second electrodes are so disposed that at least portions of the electrodes are in an opposing disposition. Electronic circuitry is coupled to the electrodes and in use of the device electronic detection circuitry detects a varying capacitance between the electrodes as the amount of liquid flowing through the flow passage varies.

The flow sensing device is particularly suited for sensing milk flow in apparatus for the machine milking of animals. The sensing device includes a switching arrangement operable in response to detected liquid flow to open and close the flow passage and actuate a vacuum operated ram to remove teat caps from a milking animal.

25 Claims, 9 Drawing Figures

LIQUID FLOW SENSING DEVICE

This invention relates to a liquid flow sensing device and more particularly to an electronic liquid flow sensing device which has particular application for use in apparatus for the removal of teat cups from milking animals.

Liquid flow sensing devices which are intended primarily for use in apparatus for the removal of teat cups from milking animals are known. Usually such devices are of a mechanical operation and rely on a movable container to operate a valve unit which activates a teat cup removal unit, the latter usually being in the form of a pneumatic cylinder. For example, in our New Zealand Patent Specification Nos. 183315 and 187779 there are disclosed liquid flow sensing devices which incorporate a tipping canister to operate a valve unit for the opening and closing of the milk line to a teat cup cluster and a vacuum line to a cluster removal cylinder.

Apparatus of this type suffer from a number of drawbacks. For example, the physical size of the sensing unit often leads to restrictions and difficulties associated with mounting and correct operation of the device in a milking parlour. The device can be prone to malfunction if not correctly mounted and installed in the parlour due to the device relying for correct operation on movement of a container. These liquid flow sensing devices also incorporate a large number of moving parts which are not only prone to wear and breakage but at the manufacturing stage require close manufacturing tolerances to be met to ensure not only correct movement of the various parts but also correct sealing of the liquid flow passages and vacuum lines. A still further problem can arise when hygiene requirements need to be met, especially in he area of washing of the device at the completion of milking.

The object of the present invention is to provide an electronic flow sensing device which does some way to overcoming the foregoing problems normally associated with mechanical flow sensing devices.

According to one broad aspect of the invention therefore there is provided a liquid flow sensing device comprising a flow sensor having a flow passage through which liquid can flow, a first electrode disposed with a first wall of the flow passage so as to extend about a portion of the flow passage, a second electrode disposed with a second wall of the flow passage in that portion of the flow passage about which the first electrode extends such that at least portions of the electrodes are in an opposing disposition and electronic detection means coupled to said electrodes, said means in use detecting a varying capacitance between the electrodes as the amount of liquid flowing through the passage varies.

According to a second broad aspect of the invention there is provided a method of sensing liquid flow comprising directing the liquid flow through a flow passage in which a pair of spaced apart electrodes are disposed such that the liquid flow passes between said electrodes and electronically detecting the varying capacitance between the electrodes as the amount of liquid flowing through the passage varies.

In a preferred form of the invention the liquid flow sensing devices is part of an apparatus for the removal of teat cups from a milking animal. The apparatus includes switching means operable in response to detected liquid flow in the sensing device to open and close said flow passage and activate a vacuum operated removal ram.

In the following more detailed description of the invention reference will be made to the accompanying drawing in which.

Figures 1, 2, 9:
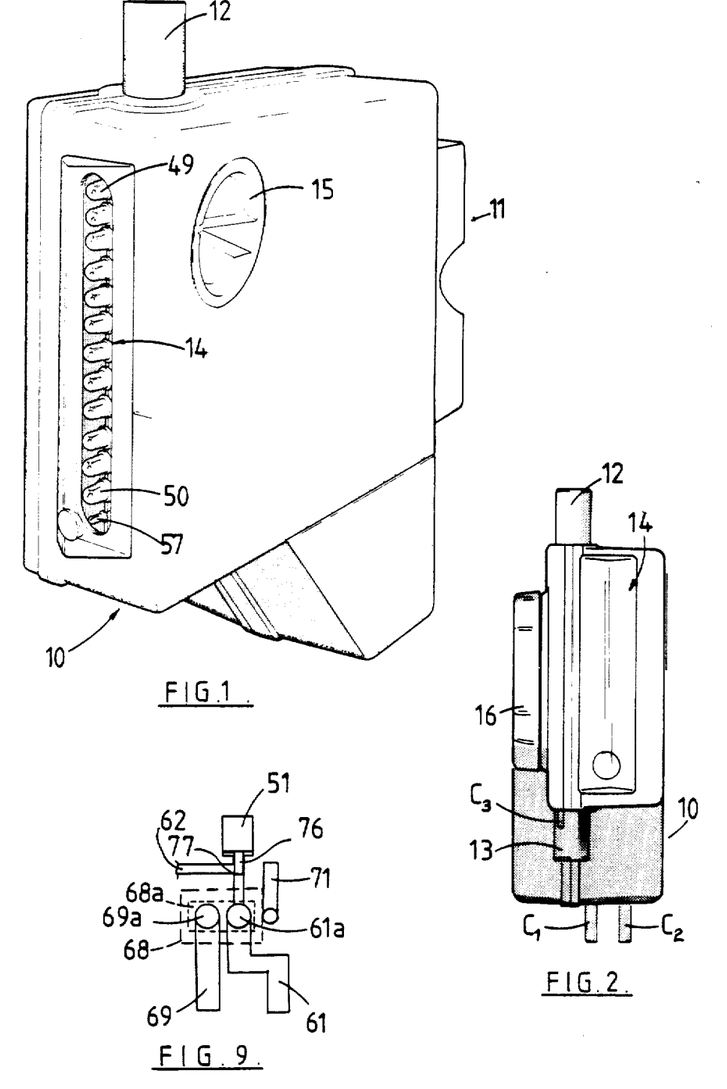
FIG. 1 is a perspective view of a teat cup cluster removal apparatus which incorporates a liquid flow sensing device according to the present invention.
FIG. 2 is an end elevational view of the apparatus appearing in FIG. 1.
FIG. 9 is a schematic layout of the complex of passageways and ports within the vacuum switch of FIGS. 7 and 8.

Referring firstly to FIGS. 1 and 2 of the drawings the apparatus (except for the pneumatic removal ram—which is not shown in the drawings) is housed within a housing 10 which is provided with a suitable mounting clamp arrangement 11 which permits ready mounting of the housing to a stanchoin in a milking parlour. Projecting top and bottom of the housing 10 are inlet 12 and outlet 13 connections to which the milk line (not shown) of a milking plant can be attached. Also projecting from housing 10 are couplings $C_1$ and $C_2$ for lines connecting the device to a pneumatic cluster removal ram 54 (see FIG. 5) and a remote air switch 46 (see also FIG. 5).

The housing 10 also includes a bar graph display 14, a knob 15 whereby adjustments for flow rate (as hereinafter will be described) can be carried out and a removable cover plate 16 which covers and clamps in place a diaphragm (as will also be hereinafter described). A power input (not shown) is positioned on the underside of the housing for connection with a power lead.

Figure 3:
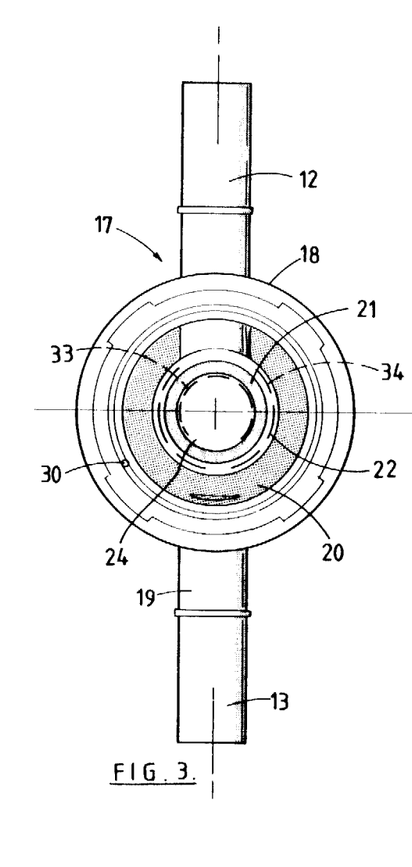
FIG. 3 is an elevational view of the fluid flow sensor of the flow sensing device which is incorporated in the apparatus as shown in FIGS. 1 and 2.
Figure 4:
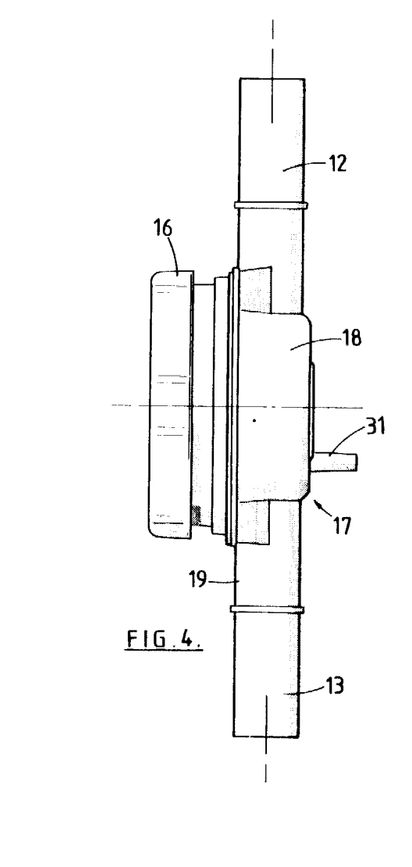
FIG. 4 is a side view of the sensor shown in FIG. 3 but with a diaphragm cover attached therewith.

The inlet 12 and outlet 13 are preferably formed integrally with a flow sensor 17 which according to its preferred form is illustrated in FIGS. 3 and 4 of the drawings. The sensor 17 comprises a body 18 from which inlet 12 projects. A conduit 19 projects from body 18 to be diametrically opposed and coaxial with inlet 12. The free end of conduit 19 is formed as or is connected to outlet 13. Body 18 provides a cavity 20 into which conduit 19 opens.

Inlet 12 opens into an annular space 21 formed by a wall 22 which projects from the back 23 of cavity 20. Located coaxially within the confines of wall 22 is a central hub 24. The inner wall surface 22a of wall 22 and the peripheral surface 24a of hub 24 are thus spaced apart and are approximately parallel to one another.

It is preferred that inlet 12 opens into the annular space 21 as close as possible to back 23 and in like manner conduit 19 opens from cavity 20 as close as possible to back 23. This ensures that any possibility of "dead areas" in which fluid is not forced to flow is reduced. In addition a narrow annular space 21 is preferred so that the cross-sectional area of annular space 21 is approximately equal to that of inlet 12. This ensures that a low velocity flow does not result in annular space 21 which can lead to foaming of the milk.

Figure 5:
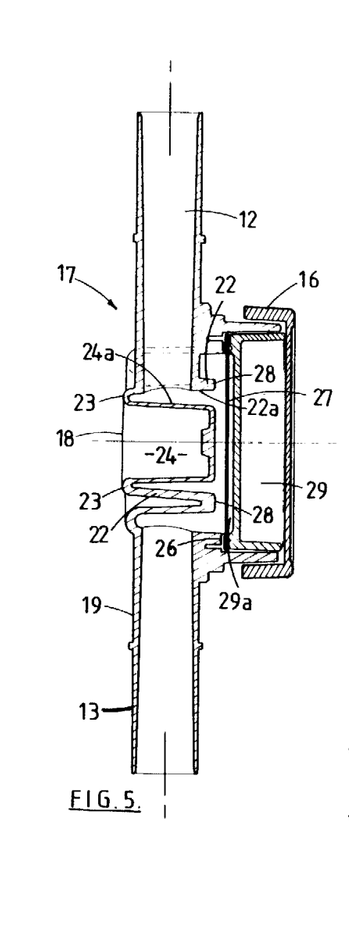
FIG. 5 is a sectioned side view of the sensor as shown in FIG. 4.

The outer peripheral edge 26 of body 18 forms a seating on which a diaphragm 27 is mounted. Diaphragm 27 can engage on the surface of hub 24 and a seating 28 of the end of wall 22 thereby closing the fluid flow passage between inlet 12 and conduit 19/outlet 13. Diaphragm 27 is held in place as previously described.

A chamber 29a within a pressure cup 29 disposed between edge 26 and cover plate 16 is formed by a cavity as a result of internal profiling of the pressure cup 29 and the diaphragm 27 located thereacross. A small bore 30 extends through the side wall of body 18 to open into chamber 29. This bore 30 opens to a port 31 to which is connectable a dry vacuum line which leads to a vacuum switch 53 as will hereinafter be more fully described.

A conductive foil electrode is embedded in each of annular wall 22 and hub 24 so as to be just below the surfaces 22a and 24a respectively and externally accessible contacts and are provided for electrical connections. The electrodes extend about the annular flow space 21 such that at least a portion of one electrode is disposed opposite to a portion of the other electrode. Accordingly there is effectively formed a coaxial capacitor with large plate area with the outer electrode screening the central or live electrode from interference.

The sensor in operation detects the amount of liquid flowing through the sensor, i.e. through the annular space 21 in the fluid flow passage connecting inlet 12 to outlet 13. The electrodes 33 and 34 effectively form a capacitor with the dielectric being formed by the liquid within the annular space 21. As the liquid is a dynamic flow of milk and air the capacitance between the electrodes varies in proportion to the amount of liquid in the flow, i.e. the more liquid in the flow the higher the capacitance. This capacitive variation is used to vary the frequency of an oscillator, the variable frequency is then detected with the result that the varying capacitance is translated into a varying voltage. This varying voltage is representative of the amount of liquid in the sensor at any time, i.e. the total capacity of the annular space 21. By electronic means the instantaneous voltage is averaged over a period of time to thereby obtain a liquid flow rate.

Referring more particularly to FIG. 5 of the drawings the block diagram illustrates an analogue section 35, a display section 36, mechanical section 37, control section 38. power supply section 39 and an override section 40. Supply section 39 provides a regulated supply which supplies a constant voltage to the electronics.

Figure 6:
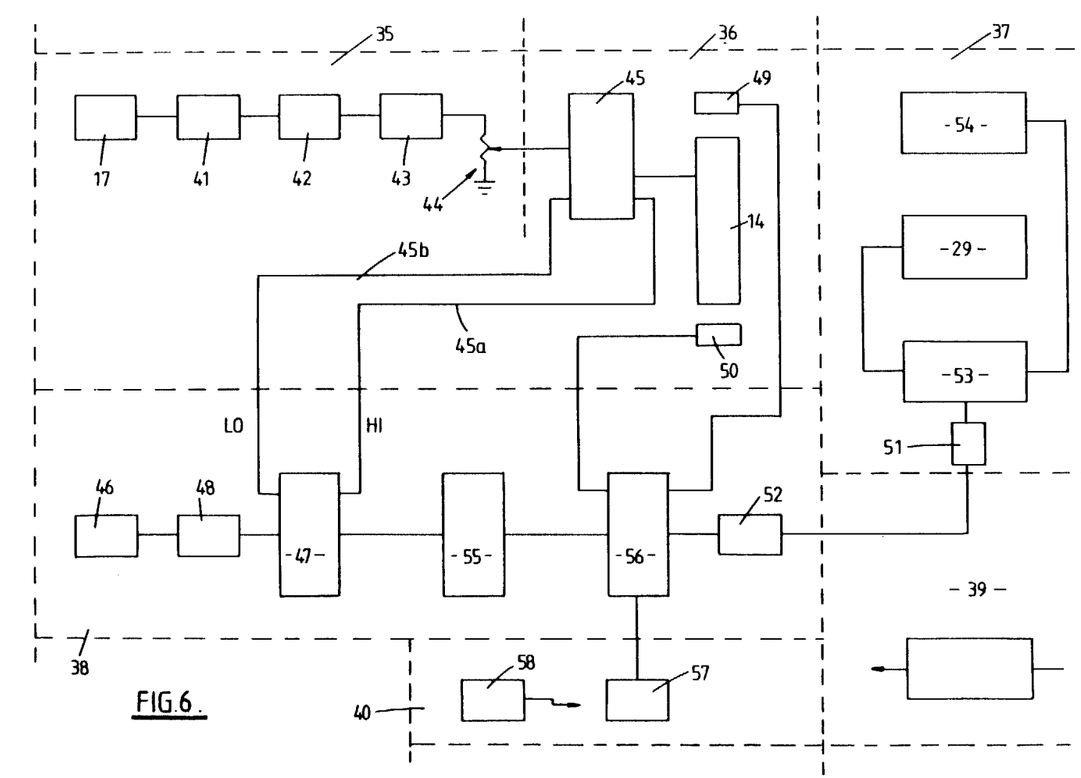
FIG. 6 is a circuit block diagram of the main electrical and mechanical componentry of the removal apparatus.

The analogue section 35 comprises sensor 17 which detects the changing capacitance and this is converted by oscillator 41 into a varying frequency. In the preferred form of the invention the oscillator is of a high frequency type. This variable frequency is detected by detector 42 which operates on a frequency modulated detection technique (e.g. phase locked loop). The resultant varying voltage is amplified by d.c. amplifiers 43 with temperature compensation and passes through take-off set 44 to a display driver 45 in the display section 36. The take-off set 44 is adjustable by knob 15 on housing 10.

The display driver 45 drives the bar graph display 14 and is connected to control logic circuitry 47 via lines 45a and 45b. Driver 45 thus operates as an analogue to digital convertor. The digital control section 38 also has input from an acutation switch 46 (which is in the form of an air switch) via a switch logic 48. This switch is coupled to coupling $C_3$ via an air line and normally the switch would be located in the vicinity in which the operator was working, e.g. adjacent the teat cup cluster which is connected via a milk line to inlet 12.

The device can operate in either an automatic or a manual mode as determined by switch logic 48. In the preferred form of operation a single operation of the air switch 46 results in automatic mode of operation being selected (this being indicated in the display section by flashing "auto" light 49). Two operations of the air switch 46 results in selection of the manual mode and the lumination of a flashing "manual" light 50 in the display section. The operator can therefore readily select manual or automatic mode of operation and observe whether the device is in the automatic or manual mode of operation by reference to indicator lights 49 and 50.

In a typical operation the operator will push air switch 46 once to select automatic mode whereupon solenoid 51, driven by solenoid driver 52, operates vacuum switch 53 such that vacuum is switched from the ram 54 to chamber 29. Vacuum switch 53 also switches vacuum to chamber 29 whereby diaphragm 27 is lifted off seating 22 so that the flow passage is opened. As a consequence the teat cups can be taken to the animal and applied.

Once a pre-set flow rate, which is operator adjustable via known 15, has been achieved timer circuit 55 operates to ensure the cups are not removed for a period of time even if the flow falls below the take-off flow level. If the flow does not again exceed the set level the timer 55 times out and cup removal is initiated through the solenoid logic 56 coupled to solenoid driver 52. If during the timing sequence, however, the pre-set flow is exceeded the timer will count back up to zero if the flow rte remains above the take-off flow level for a sufficient length of time otherwise it will count back up for a period commensurate with the time the flow rate is above the take-off level. To initiate the automatic take-off once the automatic mode has been selected the flow must firstly exceed the pre-set level (which is higher than the take-off level). This operational phase ensures that allowance is made for animals whose actual let down follows some time after an initial flow of milk occurs when the teat cups are first placed on the animal.

When the pre-set flow rate has been exceeded and when milking is nearly completed and the flow rate falls below the take-off level the timer circuit 55 once again establishes a time delay so that there is a delay between the take-off level being reached and the solenoid 51 being operated. Cup removal can, however, be achieved at any time (after selection and a small delay time) by operating the air switch 46. This time delay permits switch logic 48 to distinguish between cup removal and operation of the air switch 46 to achieve manual mode of operation.

Activation of solenoid 51 causes the vacuum switch to switch over and disconnect vacuum from chamber 29 (which causes diaphragm 27 to seat on seating of wall 22 and close the flow passage thereby removing vacuum from the cluster) and connect vacuum to the ram 54 which consequently operates to lift the teat cup cluster away from the animal.

The timer 55 circuit has two functions. It is firstly installer settable to zero or a fixed time to provide a time delay from the time milking starts to the time when the unit becomes flow controlled. This means that for a period of time from commencement the unit will not terminate milking even if the flow falls below the take-off level. In addition the timer section 55 provides an adjustable time delay for the time from reaching the take-off flow level until the cluster is actually removed.

The manual mode of operation is selected by operating the air switch 46 twice but within the delay time mentioned above. In this manual mode of operation cup removal is initiated by operating the air switch 46. Whilst the bar graph display 14 will still indicate flow during manual operation cup removal is no longer dependent on the actual flow rate. It is envisaged that the main application for the manual mode of operation would be during a wash cycle where the unit can be left in this mode until the wash cycle is completed.

Cluster remove override section 40 provides for instantaneous removal of the cluster from an animal irrespective of milk flow. This section is intended primarily for use in rotary milking parlours where operators may wish the clusters to be removed at a certain position of the platform independent of milk flow. The remove override 57 conveniently consists of a phototransistor which senses light from a modulated light transmitter 58 mounted at the position of the platform at which an operator wishes the clusters to be removed. The phototransistor 57 is thus coupled to the solenoid logic 56 so that when actuated the solenoid driver 52 powers up solenoid 51 to operate the vacuum switch 53 and thereby switch vacuum from chamber 29 and to ram 54.

Figure 7:
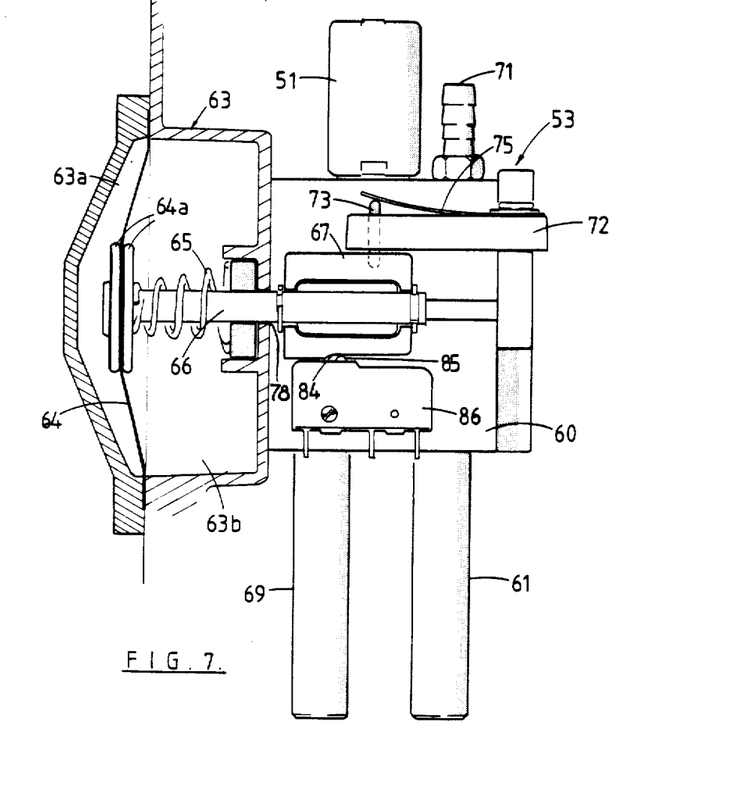
FIG. 7 is a sectional elevational view of a vacuum switch incorporated in the apparatus.
Figure 8:
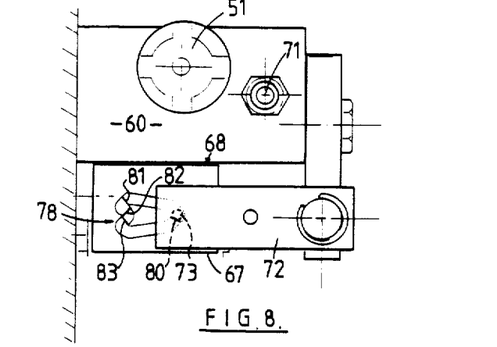
FIG. 8 is a plan view of the latch block of the vacuum switch depicted in FIG. 7.

Referring now to FIGS. 7 and 8 of the drawings there is shown the vacuum switch 53 (in the "cups off" position) and mounted therewith solenoid 51. The vacuum switch 53 consists of a body 60 having an inlet 61 to which the vacuum supply line can be attached. A bore 62 leads from port 61 into a chamber 63 in which a diaphragm 64 is positioned, said diaphragm effecting dividing chamber 63 into two parts 63a and 63b. Diaphragm 64 is spring loaded by a spring member 65. A shaft 66 extends from diaphragm 64 and is slidingly retained in suitable bearing apertures mounted with body 60. Shaft 66 is mounted to a pair of plates or discs 64a between which the central area of diaphragm 64 is sandwiched. Chamber 63a is vented to atmosphere.

Attached to shaft 66 is a latch block 67 with which is mounted a port coupler 68. The port coupler 68 incorporates a groove 68a which can span the ports 61a and 69a from inlet 61 and a passageway 69 respectively. Passageway 69 is connectable to a vacuum line extending to the ram 54. Port 61a and a passageway 71 (which is coupled by a vacuum line leading to port 31 of the flow sensor) can be coupled by groove 68a. In the position shown in FIG. 6 (i.e. the "cups off" position) ports 61a and 69a are coupled by the port coupler 68 so that vacuum will be applied to the ram 54. Movement of diaphragm 64 against the spring 65 will, however, cause shaft 66 to slide and this will move port coupler 68 to a new position where port 61 and passageway 71 are coupled thereby removing vacuum from the ram 54 and applying vacuum to chamber 29 in the flow sensor.

Latch block 67 incorporates in a surface thereof a continuous stepped groove 78. One end of a pin 73 mounted by a latch arm 74 and spring biassed by a lead spring 75 engages with groove 78. The groove 72 and the co-operating pin 73 on latch arm 74 forms a bi-stable latch so that the switch is latched either in the position as illustrated or in a position where the pin is located in the cusp end of the grouve 78 which corresponds with the shaft 66 having been moved to a position where the port coupler 68 couples port 61 and passageway 71.

Movement of shaft 66 is achieved by solenoid 51 being operated so that the plunger 76 thereof is lifted from a seating 77 in bore 62. A momentary lifting of the plunger 76 applies vacuum chamber 63a causing a pressure differential between chambers 63a and 63b thus resulting in diaphragm 64 moving against the spring bias 65 thereby moving shaft 66. To return the vacuum switch to the illustrated situation solenoid 51 is once again activated (which due to a loose slighting fit between shaft 66 in bearing aperture 78 will have returned to the same pressure as chamber 63b) thereby allowing diaphragm 64 to move shaft 66 so that the latch pin releases latch block 67 with the result that diaphragm 64 moves under the influence of spring 65 and thereby draw with it shaft 66.

Referring to FIGS. 7 and 8, the pin 73 moves around continuous groove 78 in an anti-clockwise direction. Steps 80, 81, 82 and 83 are so positioned that once the pin has passed thereover it cannot retrace its movement along the groove. Accordingly, when the latch is in the position illustrated or when the pin 73 is at the cusp end, steps 80 and 82 respectively prevent reverse movement of the pin when the latch block is initially moved by the action of the diaphragm moving. Step 83 prevents reverse movement of the pin when the movement of the latch block has caused the pin to move out of the cusp and over step 83.

Preferably a cam surface 84 is provided on latch block 67, this cam surface being engaged by the operating plunger 85 of a micro-switch 86. The switch 86 can thus sense the position of the latch block and thus be used a a sensor to the logic circuiting of the device such that the true position of the latch block when the device is activated can be determined. The electronics can thus be syncronosed with the vacuum switch 53.

The device according to the present invention provides an electronic means of sensing a milk flow from a milking animal and at an operator set flow rate initiates a circuit. After some elapsed time as determined by the timer circuit, vacuum to the teat cup cluster is automatically switch off and vacuum is then directed to the removal ram which operates to gently lift the teat cup cluster from the animal . The device does not suffer from the drawbacks of previously known cluster remover devices which depend for operation on mechanical means of sensing the milk flow and then operating a valving arrangement to initiate removal of the teat cup cluster.

We claim:

1. A liquid flow sensing device comprising:
    a flow sensor having a flow passage through which liquid can flow, said flow passage having a first wall and a second wall, said flow sensor comprising a body having an annular space therein and into which opens an inlet whose cross-sectional area is substantially the same as the cross-sectional area of said annular space, said body having an outlet coaxially disposed with respect to said inlet, said annular space being formed at least in part by said first wall and said second wall and disposed such that the axis of said annular space is at substantially right angles to the axis of said inlet and outlet, a first electrode disposed with a first wall of the flow passage so as to extend about a portion of the flow passage so as to extend about a portion of the flow passage, a second electrode disposed with a second wall of the flow passage in that portion of the flow passage about which the first electrode extends such that a least portions of the electrodes are in an opposing disposition, electronic detection means coupled to said electrodes for detecting a varying capacitance between the electrodes as the amount of liquid flow through the passage varies and flow passage closure means comprising a diaphragm mounted with said body, said diaphragm having a first surface which can sealingly close said annular space such that the fluid flow to said outlet is prevented, and a second surface exposed to a chamber in which a sub-atmospheric pressure can be established.

2. The device of claim 1 wherein the electrodes consist of conductive elements embedded in said first and second walls.

3. The device of claim 2 wherein the first and second walls are concentrically disposed.

4. The device of claim 1 further including a vacuum switch, said switch incorporating three ports connectible respectively to said chamber, a teat cup removal device and a vacuum input, there being port coupling means operative by actuating means whereby the chamber port and removal device port can be selectively coupled with said vacuum line.

5. The device of claim 4 wherein the coupling means comprises a port coupler movable between a first position in which said vacuum line is coupled to said removal device and a second position in which the vacuum line is coupled to said chamber, said coupler being connected to a diaphragm located within a chamber in which a pressure differential can be established to move said diaphragm against biasing means, said coupler being movable between said first and second positions in response to movement of said diaphragm.

6. The device of claim 5 wherein a latching arrangement is provided to latch said coupler in the said first or second position until a pressure differential is established in said chamber to move said coupler such that it becomes unlatched.

7. The device of claim 4 further including oscillator means the frequency of which is varied by the varying capacitance detected by said electronic detection means, said varying frequency being translated into a varying voltage and averaged over a period of time by averaging means to obtain a liquid flow rate.

8. The device of claim 7 wherein visual display means is coupled electronically to said detection means, such that the varying flow rate detected by said detection means is translated into a visual display.

9. The device of claim 7 wherein the electronic detection means is coupled to electronic control circuitry which includes control means coupled to said vacuum switch actuation means and which controls the operation of said actuation means such that said vacuum switch operates in response to a pre-determined minimum flow rate being detected by said detection means.

10. The device according claim 9 further including a timing circuit having a first timer which establishes a time period at the commencement of liquid flow during which operation of the actuation means is overridden should the minimum flow rate be detected during such time period and a second timer which establishes a time delay between said minimum flow rate being detected after said time period has elapsed and operation of the actuation means being recommenced.

11. The device of claim 10 wherein a vacuum operable ram is coupled to said vacuum switch via said removal device port.

12. A liquid flow sensing device comprising a flow sensor having a flow passage through which liquid can flow, a first electrode disposed with a first wall of the flow passage so as to extend about a portion of the flow passage, a second electrode disposed with a second wall of the flow passage in that portion of the flow passage about which the first electrode extends such that at least portions of the electrodes are in an opposing disposition and electronic detection means coupled to said electrodes, said means in use detecting a varying capacitance between the electrodes, said varying capacitance being used to vary the frequency of oscillator means, said varying frequency being translated into a varying voltage and instantaneous voltage averaged over a period of time by electronic averaging means to obtain an output representing liquid flow; said flow sensor comprising a body having an annular space therein and into which opens an inlet, said body having an outlet into which liquid flow issuing from the annular space can pass, said annular space being formed at least in part by said first and second walls, and wherein said liquid flow sensing device further includes flow passage closure means comprising a diaphragm mounted with said body, said diaphragm having a first surface which can sealingly close said annular space such that the fluid flow to said outlet is prevented, and a second surface exposed to a chamber in which a sub-atmospheric pressure can be established.

13. The device of claim 12 further including a vacuum switch, said switch incorporating three ports connectible respectively to said chamber, a teat cup removal device and a vacuum input, there being port coupling means operative by actuating means whereby the chamber port and removal device port can be selectively coupled with said vacuum line.

14. The device of claim 13 wherein the coupling means comprises a port coupler movable between a first position in which said vacuum line is coupled to said removal device and a second position in which the vacuum line is coupled to said chamber, said coupler being connected to a diaphragm located within a chamber in which a pressure differential can be established to move said diaphragm against biasing means, said coupler being movable between said first and second positions in response to move of said diaphragm.

15. The device of claim 14 wherein a latching arrangement is provided to latch said coupler in the said first or second position until a pressure differential is established in said chamber to move said coupler such that it becomes unlatched.

16. The device of claim 13 wherein the electronic detection means is coupled to electronic control circuitry which includes control means coupled to said actuating means and which controls the operation of said actuating means such that said vacuum switch operates in response to a predetermined minimum flow rate being detected by said detection means.

17. The device of claim 16 further including a timing circuit having a first timer which establishes a time period at the commencement of liquid flow during which operation of the actuation means is overridden should the minimum flow rate be detected during such time period and a second timer which establishes a time delay between said minimum flow rate being detected after said time period has elapsed and operation of the actuation means being recommenced.

18. A liquid flow sensing device comprising a flow sensor having a flow passage through which liquid can flow, first and second electrodes disposed about said flow passage, electronic detection means coupled to said electrodes, said means in use detecting a varying capacitance between the electrodes as the flow rate through the passage varies, flow passage closure means, a chamber associated with said closure means and in which sub-atmospheric pressure can be established, a vacuum switch, said switch incorporating ports connectable respectively to said chamber, a teat cup removal device and a vacuum input, there being port coupling means operative by actuation means whereby the chamber port and removal device port can be selectively coupled with said vacuum line.

19. The device of claim 18 further including a vacuum switch, said switch incorporating three ports connectible respectively to said chamber, a teat cup removal device and a vacuum input, there being port coupling means operative by actuating means whereby the chamber port and removal device port can be selectively coupled with said vacuum line.

20. The device of claim 19 wherein the coupling means comprises a port coupler movable between a first position in which said vacuum line is coupled to said removal device and a second position in which the vacuum line is coupled to said chamber, said coupler being connected to a diaphragm located within a chamber in which a pressure differential can be established to move said diaphragm against biasing means, said coupler being moveable between said first and second positions in response to movement of said diaphragm.

21. The device of claim 20 wherein a latching arrangement is provided to latch said coupler in the said first or second position until a pressure differential is established in said chamber to move said coupler such that is becomes unlatched.

22. The device of claim 19, wherein the electronic detection means includes a converting means which translates the varying capacitance into a varying voltage which via electronic averaging means is averaged over a period of time to establish a liquid flow rate.

23. The device of claim 22 wherein the electronic detection means is coupled to electronic control circuitry which includes control means coupled to said vacuum switch actuation means and which controls the operation of said actuation means such that said vacuum switch operates in response to a predetermined minimum flow rate being detected by said detection means.

24. The device according to claim 23 further including a timing circuit having a first timer which establishes a time period at the commencement of liquid flow during which operation of the actuation means is overridden should the minimum flow rate be detected during such time period and a second timer which establishes a time delay between said minimum flow rate being detected after said time period has elapsed and operation of the actuation means being recommenced.

25. The device of claim 24 wherein a vacuum operable arm is coupled to said vacuum switch via said removal device port.

* * * * *

UNITED STATES PATENT AND TRADEMARK OFFICE
CERTIFICATE OF CORRECTION

PATENT NO. : 4,714,048

DATED : 12/22/87

INVENTOR(S) : Jefferies ET AL.

It is certified that error appears in the above-identified patent and that said Letters Patent is hereby corrected as shown below:

| COLUMN | LINE | DESCRIPTION |
|--------|------|-------------|
| 6 | 3 | Delete "GROUVE" INSERT --GROOVE-- |

Signed and Sealed this

Seventh Day of June, 1988

Attest:

Attesting Officer

DONALD J. QUIGG

Commissioner of Patents and Trademarks